C. G. SWEBILIUS.
AUTOMATIC FIREARM.
APPLICATION FILED APR. 16, 1917.
1,402,459.
Patented Jan. 3, 1922.
6 SHEETS—SHEET 5.
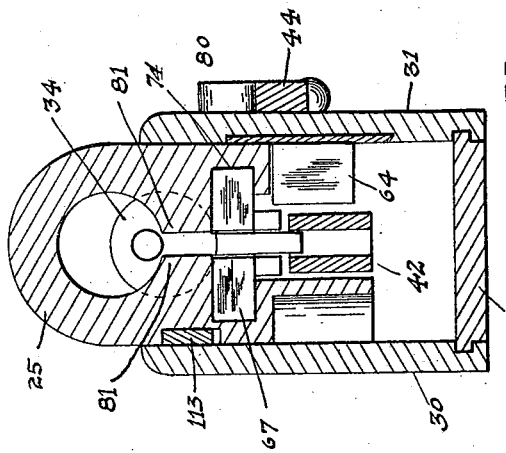
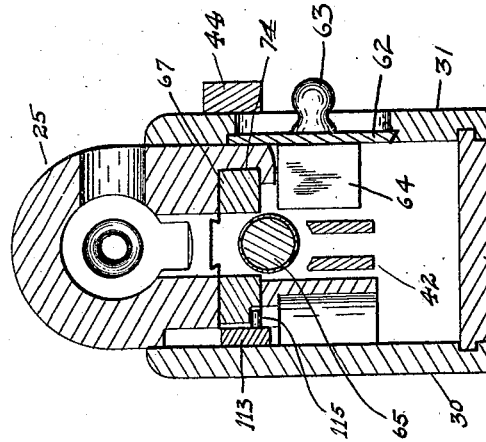
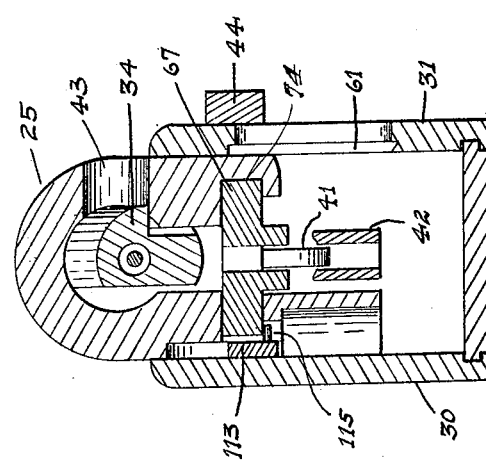
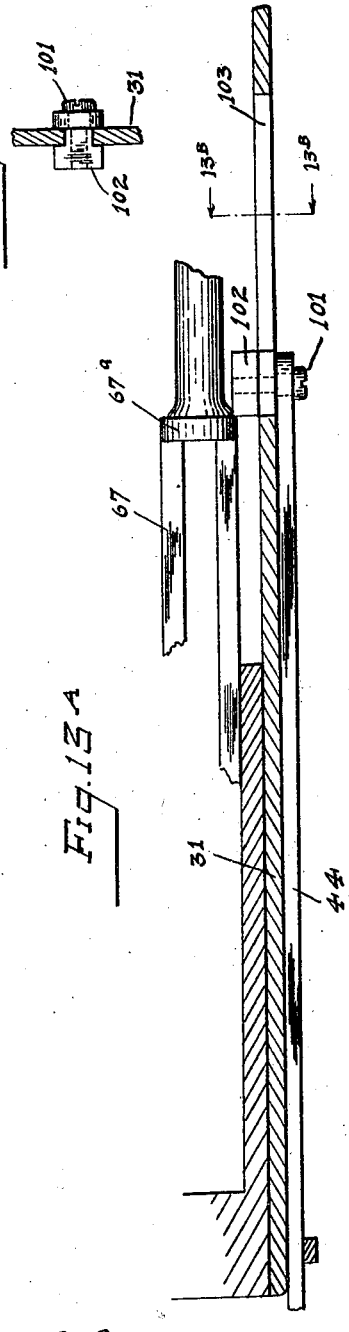

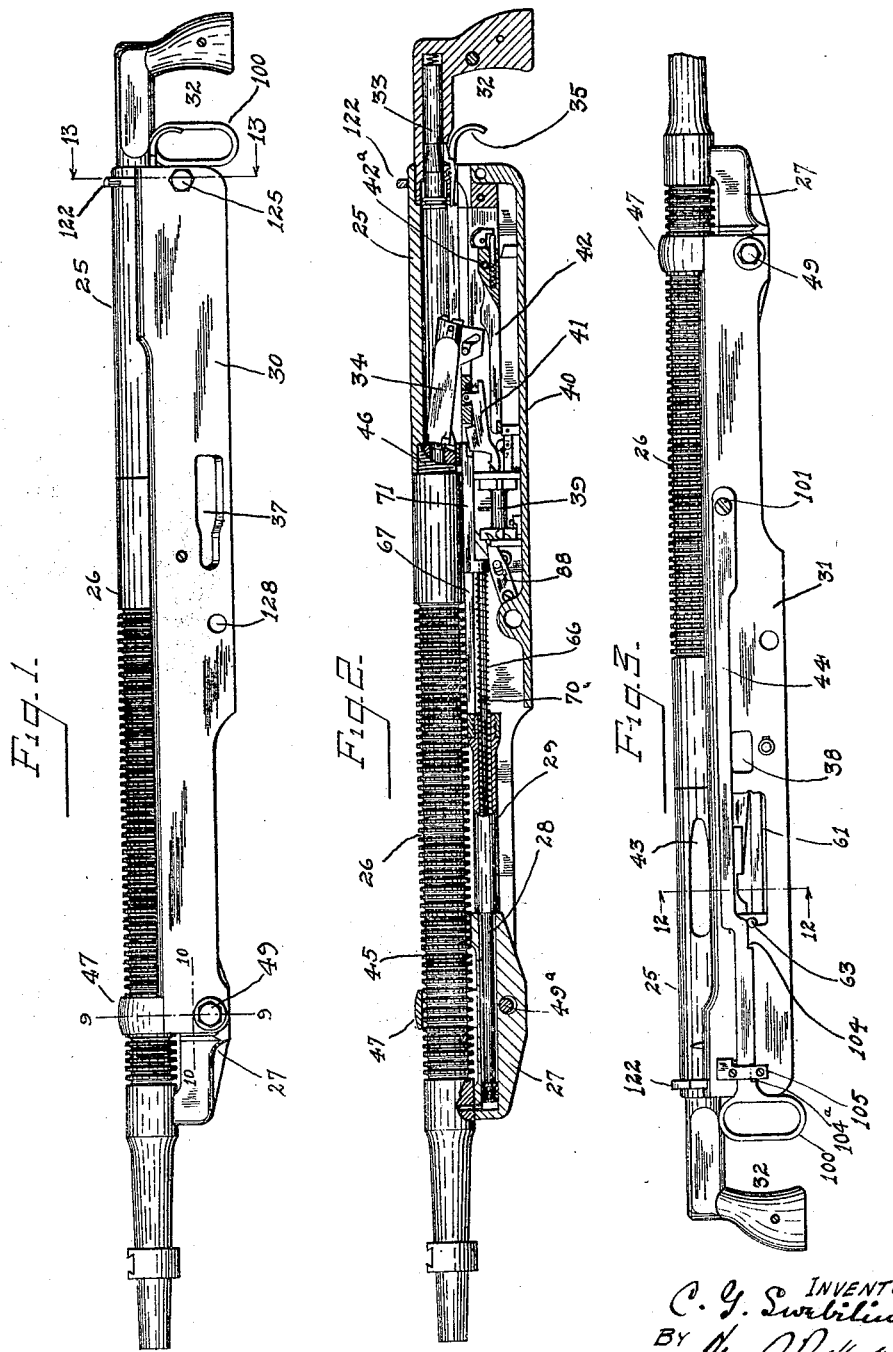

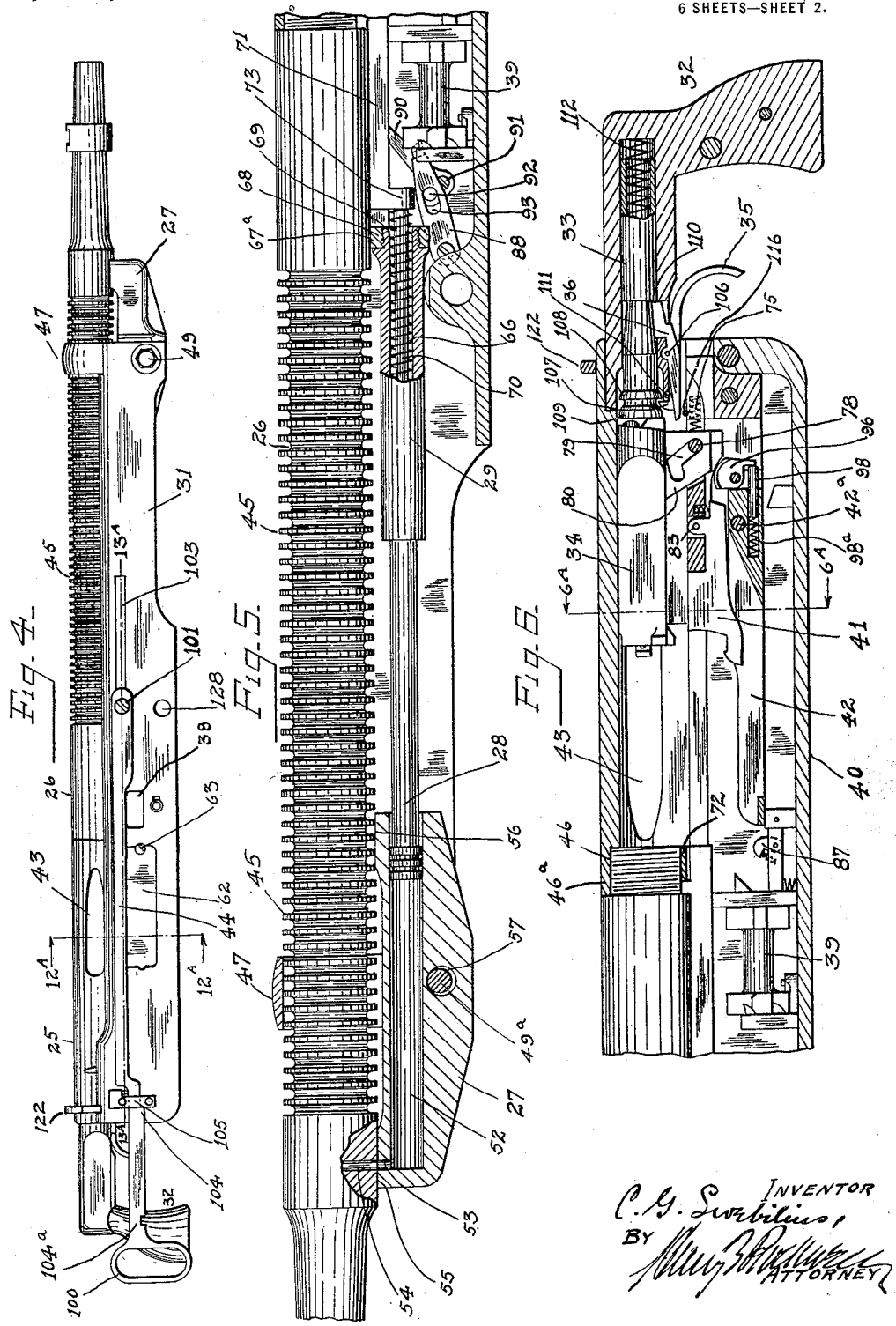

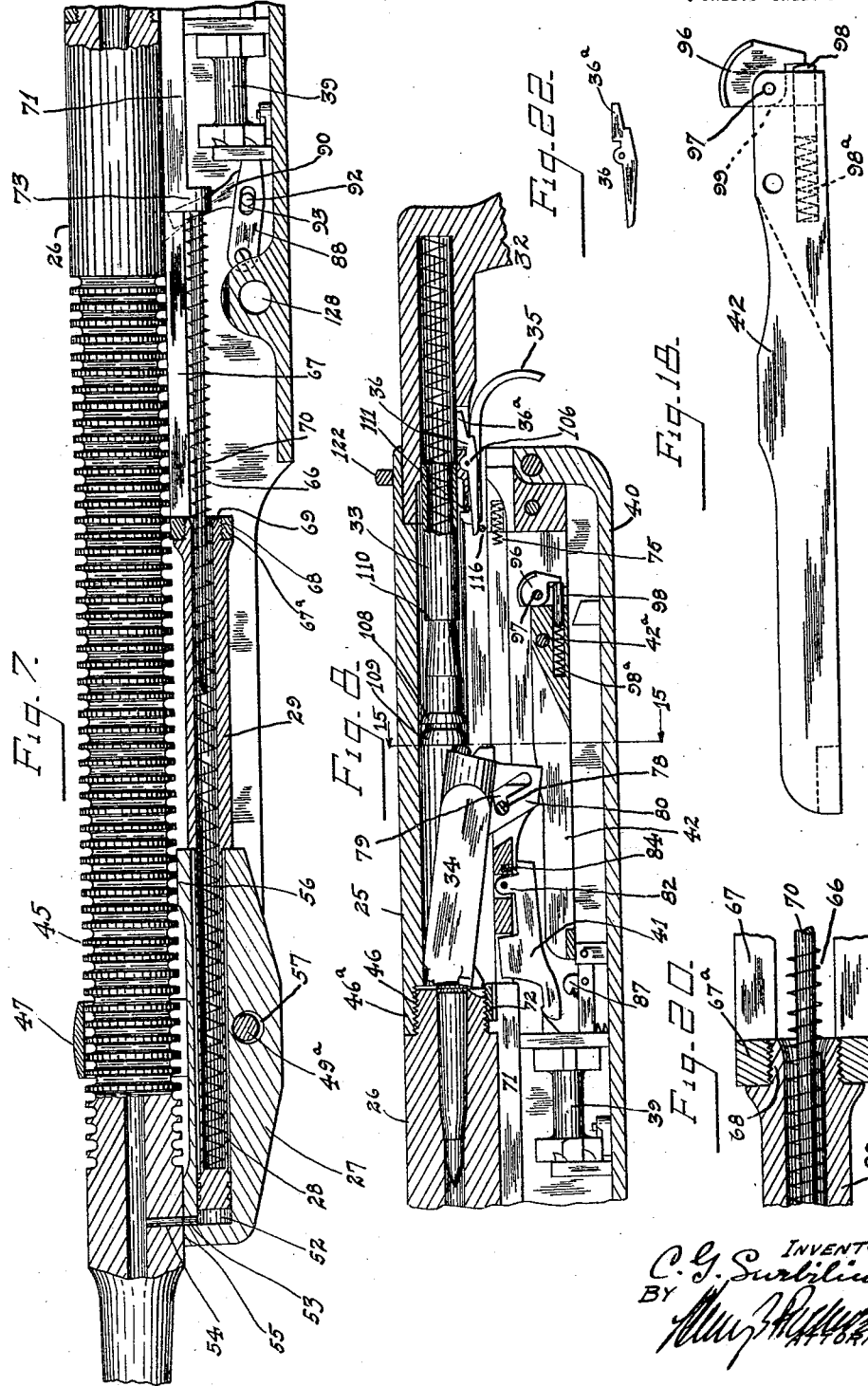

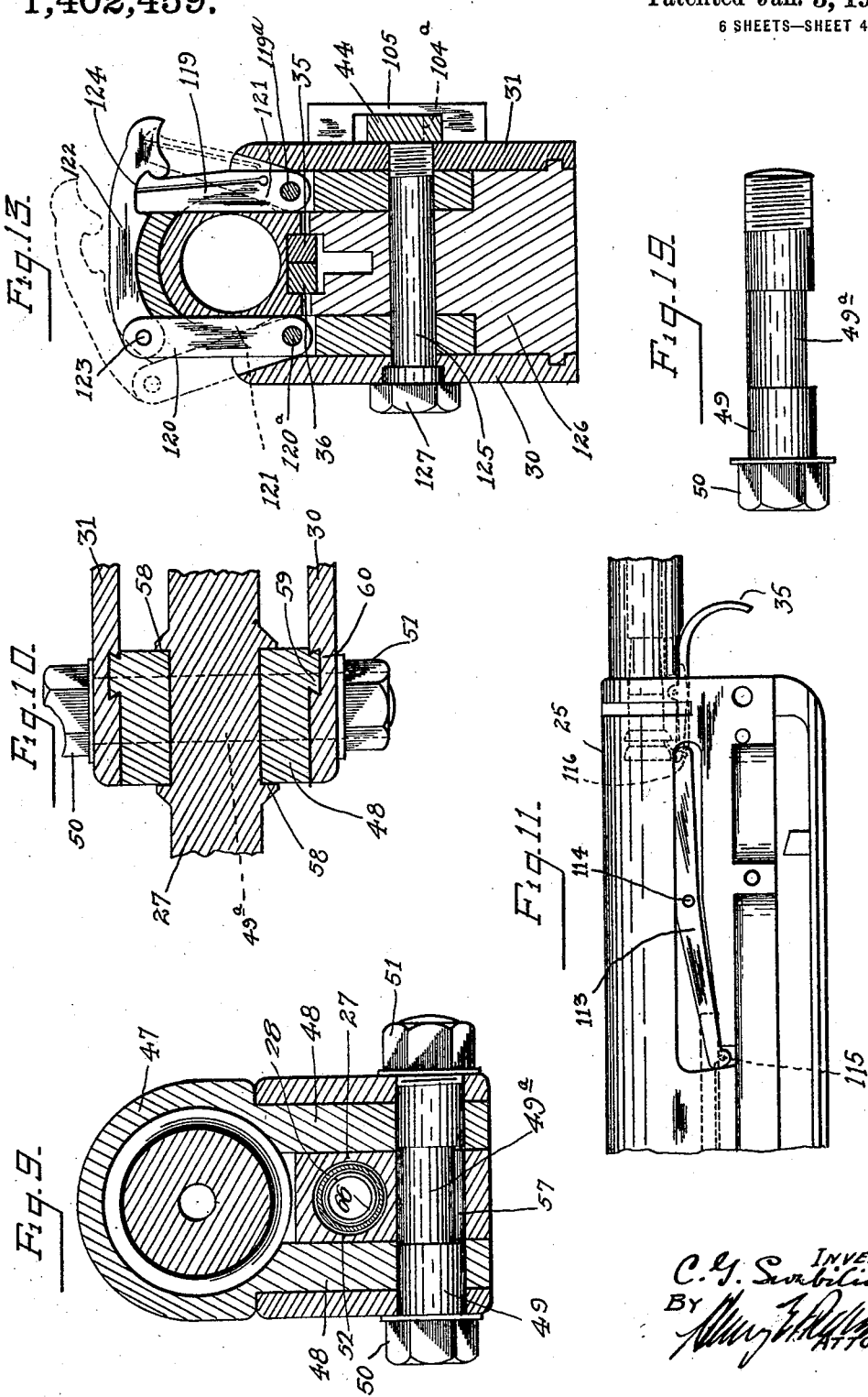

C. G. SWEBILIUS.
AUTOMATIC FIREARM.
APPLICATION FILED APR. 16, 1917.
1,402,459.
Patented Jan. 3, 1922.
6 SHEETS—SHEET 6.
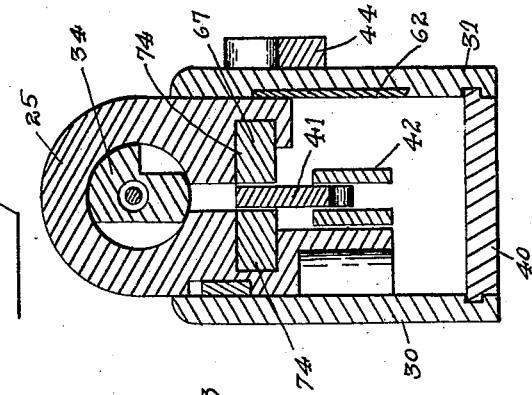
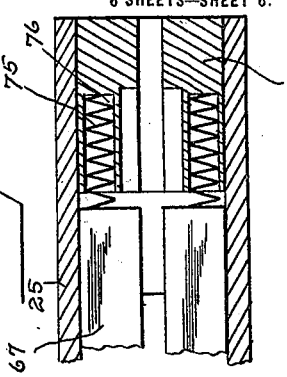
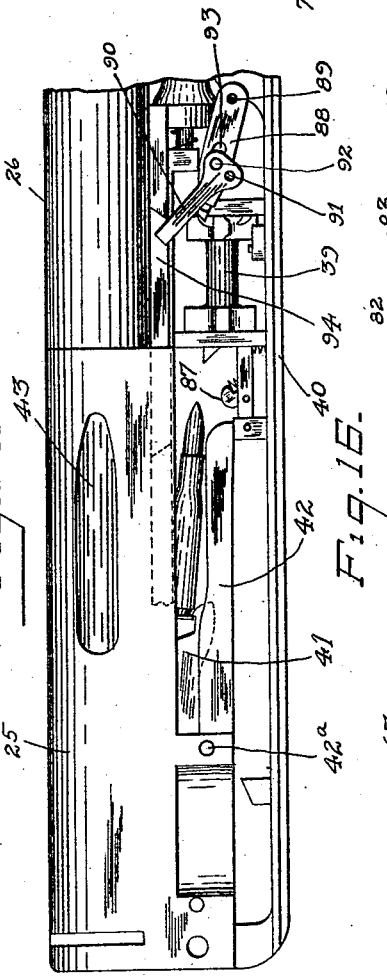
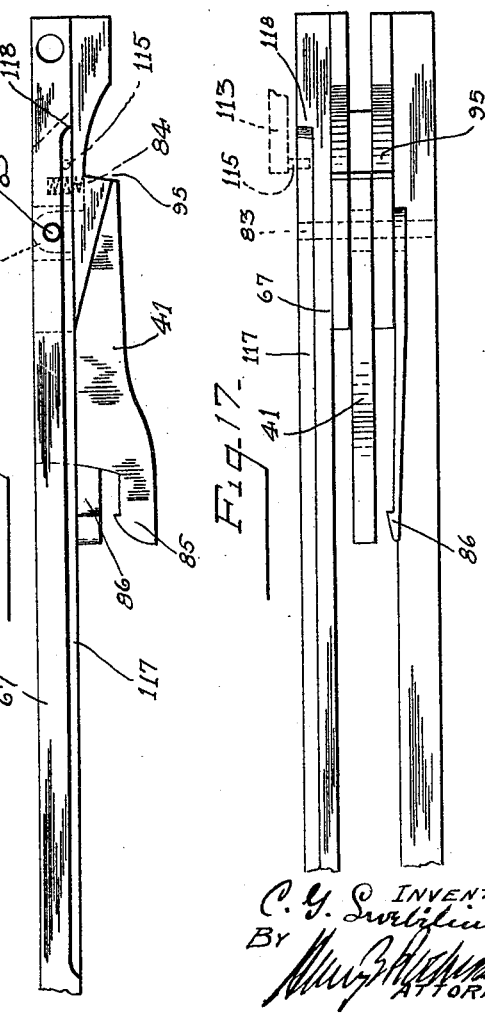
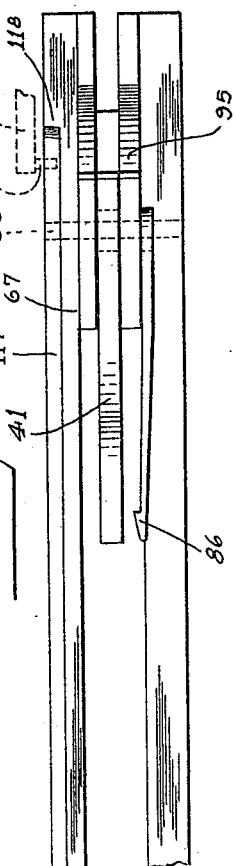

UNITED STATES PATENT OFFICE.

CARL GUSTAF SWEBILIUS, OF NEW HAVEN, CONNECTICUT, ASSIGNOR, BY MESNE ASSIGNMENTS, TO THE MARLIN FIREARMS CORPORATION, OF NEW HAVEN, CONNECTICUT, A CORPORATION OF DELAWARE.

AUTOMATIC FIREARM.

1,402,459.      Specification of Letters Patent.      Patented Jan. 3, 1922.

Application filed April 16, 1917. Serial No. 162,543.

*To all whom it may concern:*

Be it known that I, CARL GUSTAF SWEBILIUS, a citizen of the United States, residing in the city and county of New Haven, State of Connecticut, have invented certain new and useful Improvements in Automatic Firearms, of which the following is a full, clear, and exact description.

This invention relates to automatic firearms and it has special reference to machine guns, although certain features of the invention may be used to advantage in automatic rifles and weapons of other types.

One of the primary objects of the invention is the provision of an improved firearm of the type in which the explosive gases which are formed by the discharge of the cartridge are conducted from the barrel to a gas cylinder containing a piston or plunger which operates the action rod, the latter in turn actuating the breech mechanism. More particularly my object is to furnish an arm of this type in which the gas cylinder is arranged parallel to the barrel and wherein said cylinder is easily removable from the gun for purposes of cleaning. My improved construction also has the advantage that the gas cylinder can be secured against the barrel very effectively, so that the inlet port of the cylinder will register with the gas port of the barrel without leakage, and furthermore the required accuracy of fit between the parts can be readily obtained.

Another object of the invention is the provision of a machine gun in which ready access is afforded to the cartridge as it occupies any of a number of positions intermediate the feed wheel and the chamber in the barrel, so that if jamming occurs the cartridge may be easily gotten at and either shifted to its proper position or removed. More particularly it is my object to provide a machine gun in which a window or opening is provided in one of the side plates to permit easy access to the cartridge, carrier, action rod, and other parts when necessary or desirable, although the window is furnished with a suitable closure so that it may be closed under normal conditions.

Another object of the invention is to provide for the easy and convenient charging of the gun preliminary to firing, by a starting handle located at one side of the gun near the gun handle and trigger.

Other objects of the invention are to simplify and improve certain details of the gun structure, such as the means for controlling the hammer from the sear, the cartridge extractor on the action rod, the cushioning means for the action rod, the handle lock, and various other features.

The invention also contemplates the production of a very simple, efficient gun composed of a minimum number of parts, which is very compact, durable and reliable.

To these and other ends the invention consists in the novel features and combinations of parts to be hereinafter described and claimed.

In the accompanying drawings,

Fig. 1 is a side elevation of a machine gun embodying my improvements, looking from the left hand side;

Fig. 2 is a view similar to Fig. 1, with certain parts shown in longitudinal section;

Fig. 3 is a view from the opposite side of the gun, with the window in the right hand side plate open, the starting handle being in the normal inoperative position;

Fig. 4 is a view similar to Fig. 3, showing the window closed, and the starting handle in the operative position;

Figs. 5 and 6 comprise in conjunction an enlarged longitudinal section of the gun, with certain parts in elevation, showing the action rod thrust back by the gas pressure to eject the shell;

Fig. 6$^A$ is an enlarged section on line 6$^A$—6$^A$ of Fig. 6;

Figs. 7 and 8 comprise in conjunction a longitudinal section with the parts in the firing position;

Figs. 9 and 10 are sections on lines 9—9 and 10—10 respectively of Fig. 1;

Fig. 11 is a detail elevation of the trip for the sear and its associated parts;

Fig. 12 is an enlarged section on line 12—12 of Fig. 3;

Fig. 12$^A$ is a section on 12$^A$—12$^A$ of Fig. 4;

Fig. 13 is an enlarged section on line 13—13 of Fig. 1;

Fig. 13$^A$ is an enlarged section on line 13$^A$—13$^A$ of Fig. 4;

Fig. 13$^B$ is a detail section on line 13$^B$—13$^B$ of Fig. 13$^A$;

Fig. 14 is a fragmentary view of the rear part of the gun looking from the right hand side with the right side plate removed;

Fig. 15 is an enlarged section on line 15—15 of Fig. 8;

Figs. 16 and 17 are a side elevation and bottom plan view of the rear part of the forked action rod;

Fig. 18 is a detail of the carrier;

Fig. 19 is a detail of the cam bolt for securing the cylinder casting to the barrel;

Fig. 20 is a detail section of a portion of the action rod;

Fig. 21 is a detail section through the rear part of the receiver, showing the buffer springs for the action rod; and Fig. 22 is a detail of the sear.

Referring to the drawings and more particularly to Figs. 1, 2 and 3, the firearm selected for illustration is a machine gun of the type wherein the automatic action is effected by pressure of the powder gases passing through a vent or port in the barrel to a gas cylinder in which operates a piston or plunger suitably connected to the breech mechanism; but while these features are important in some aspects of the invention, they are unimportant in others. In the particular form shown the gun comprises in its general features a receiver 25 at the forward end of which a barrel 26 is secured. A gas cylinder member 27 is arranged below the barrel near the muzzle, and a plunger or piston 28, operating in said cylinder member, is connected by an action rod 29 to the breech mechanism located in the receiver. On opposite sides of the receiver left hand and right hand side plates 30, 31 respectively, are secured, and these extend forward at the respective sides of the gun along the under portion of the barrel so as to enclose to a large extent the action rod and other parts of the operating mechanism. A handle 32 is fastened in the rear end of the receiver 25, and in said handle operates a spring pressed hammer 33, designed to cooperate with the breech block or bolt 34 for firing the cartridge when said breech block is in the advanced position shown in Fig. 2 wherein it is locked to hold the cartridge in the chamber of the gun. The firing of the gun is controlled by a trigger 35, adapted to be actuated by hand, and by an automatically controlled sear 36 located adjacent the trigger. The cartridges in the particular gun shown, are fed from left to right by means of belts. The belt with the cartridges thereon enters the gun through an opening 37 in the left hand side plate 30, and the empty belt passes out by an opening 38 in the right hand side plate. The belt passes over an automatically actuated feed wheel 39, mounted on the bottom plate 40 of the gun. At the proper time the cartridge located at the upper part of the feed wheel (which is of the usual type) is drawn rearwardly by an extractor 41 on the rear part of the action rod and placed on a carrier 42 pivoted at 42ᵃ in the lower part of the receiver. When the gun is fired the action rod is thrust rearwardly by the pressure of the gases issuing from the barrel into the gas cylinder and the action rod carries the breech bolt 34 rearwardly, ejecting the empty shell in the customary manner from an ejection opening 43 in the upper right hand side of the receiver. As the breech bolt 34 starts to move forward again, under the influence of the spring acting on the action rod (as hereinafter described) the action slide strikes the rear end of the carrier 42 and thereby moves upward the front end of the carrier to throw up the fresh cartridge into line with the bolt so that it will be properly chambered by the latter as the bolt reaches and is locked in its advanced or firing position. A sliding charging slide or starting handle 44, which in this instance is located on the right hand side of the gun, enables a cartridge to be fed into the chamber by manual operation in starting the gun.

Referring now to the detailed construction, I will first describe the gas cylinder and piston and the method of securing the cylinder member detachably to the gun. The barrel shown in the drawings is of the air-cooled type, having cooling fins or vanes 45, but in spite of these fins or vanes it will become very hot of the gun is fired for a protracted period, and therefore it is very desirable to have the barrel readily removable in a simple manner for the substitution of a fresh cool barrel. The barrel is threaded at its rear end, as shown at 46, and screws into a threaded socket 46ᵃ in the forward end of the receiver. Near its muzzle end a collar 47 is slipped over the barrel, and this collar has depending cheeks 48 (Fig. 9) between which the cylinder or member 27 is secured by means of a bolt 49 having a head 50 abutting one side plate and a nut 51 abutting the other side plate. This bolt 49 serves as a means for fastening both the side plates and the cylinder member to the barrel, and more specifically, it secures both plates and the cylinder member to the collar 47 and clamps the collar on the barrel. The cylinder member 27 is preferably formed of an elongated drop forging having a longitudinal bore 52 closed at the forward end and open at the rear end. At the forward end of the bore, the wall of which constitutes the cylinder proper, a small upwarly directed duct 53 is adapted to register with a downwardly leading port or vent 54 through the lower part of the barrel wall. This port 54 is located muzzleward of the collar 47, and is adapted to conduct the explosive gases into the cylinder 52. The cylinder has a machined bearing 55 at its forward end around the duct 53, which fits gas-tight against that portion of the barrel around the gas port 54. At its rear extremity the cylinder has a somewhat similar bearing surface 56 on the barrel. Intermediate the two bearing portions on the cylinder the same is provided below the gas cylinder with a transverse opening 57 for the bolt 49, this opening being located about midway between the front and rear ends of the forging. The cylinder has vertical guide grooves 58 on its respective sides, as shown more particularly in Fig. 10. These grooves are engaged tightly by the respective depending cheeks 48 on the barrel embracing collar. As the lower ends of the cheeks are spaced from each other, it will be observed from Fig. 9 that when the bolt 49 is removed the cylinder is free to drop out from between the cheeks, and when it is reinserted between the cheeks and pushed upward it will be accurately guided to the proper ultimate position by the guide grooves 58 previously described. The bolt being then reinserted and fastened, the cylinder will again be secured in the assembled position. This detachable mounting of the cylinder is an important feature of my invention, because obviously the interior of the cylinder and the piston become covered or coated with soot or other products of combustion due to the explosive gases, and it is highly desirable that the cylinder should be readily detachable for cleaning, and for taking down other parts of the gun.

Another improvement arises from the fact that I provide the securing device with means by which the cylinder may be forced into and held in the desired gas-tight relation to the barrel, so that the surfaces surrounding the duct 53 and gas port 54 respectively, will be maintained in gas-tight contact with each other. In the form shown this result is achieved by providing the intermediate portion of the bolt, which engages the opening 57, with an eccentric or cam portion 49ᵃ of slightly less diameter than the hole 57. Thus, by grasping the bolt head 50 with a suitable wrench and turning the same, the cylinder can be raised in an obvious manner, to make the necessary gas-tight contact between it and the barrel when the parts are to be assembled. The cam on the bolt permits the barrel and gas cylinder to be very accurately fitted together without the necessity of machining their entire contacting surfaces with the extreme accuracy which would otherwise be necessary.

Another feature of improvement consists in the fact that the side plates 30, 31 are secured in place at the muzzle end of the gun by the single bolt 49, without necessitating additional bolts in this location. In order to achieve this result I provide the outside faces of the cheeks 48 with vertical dovetail ribs 59, which fit transverse dovetail grooves 60 extending across the inner surfaces of the respective plates. The openings in the plates which receive the bolt 49 are located at the lower parts of the plates, so that if the dovetail connections 59, 60 were not provided the upper parts of the plates would tend to spread away from the cheeks 48; but by my improvements the plates by their grooves 60 readily slide onto the lower ends of the dovetail ribs 59, and after they are moved up to the assembled position shown in Fig. 9, and the cylinder forging 27 is moved up between the cheeks, the single bolt 49 will effectively and conveniently secure all of the parts together. Thus when it is desired to take down the gun it is merely necessary to remove a single bolt at the forward end thereof, for detaching the forward ends of the side plates, the cylinder forging and the collar, and a new barrel can be placed in position or the parts may be repaired or cleaned.

Another important feature of improvement consists in means which are provided for affording access to the cartridge when it is located at various points intermediate the feed wheel and the barrel chamber, so that if such cartridge or some of the operative parts of the breech mechanism become displaced the trouble may be conveniently rectified. In the particular form shown the right hand side plate 31 is provided with a window 61 (as best shown in Figs. 3 and 12) for affording access to the cartridge and the parts which engage the cartridge intermediate the feed wheel and the barrel chamber; and by preference this window 61 will be appreciably longer than the cartridge and will afford especially easy access to the pivoted carrier 42, the cartridge supported on said carrier, and the extractor 41 on the action rod, which pulls the cartridge back onto the carrier. Fig. 14 shows how the lower part of the receiver is cut away at the right hand side approximately from the forward end thereof, which is located adjacent the feed wheel 39, to the pivot 42ᵃ of the carrier; and the window in the right hand side plate is cut away throughout substantially the same length and to the same height, although the lower edge of the window is somewhat above the bottom plate, as will be seen by comparing Figs. 3 and 14. When the gun is in operation the window or opening in the side plate is closed by a suitable closure means, which may conveniently take the form of a sliding plate 62, suitably guided on the inside face of the side plate, and having a small knob 63 by means of which it may be manipulated. In Fig. 4 the window is closed by the plate 62, the knob 63 being located in a small notch at the forward edge of the opening 61. When it is desired to open the window the plate is slid rearwardly by pulling on the knob 63 until said knob engages a small notch or recess in the rear edge of the window opening, as shown in Fig. 3, in which position the window opening is substantially uncovered. On the inner face of the closure plate 62 the same carries or has formed thereon a block 64 projecting toward the carrier 42, and adapted to guide a cartridge 65 (Fig. 12ᴬ) onto the carrier and hold it thereon during the proper period. Thus the window closure acts as a means for holding the cartridge from lateral displacement relatively to the carrier, which might occur in some cases if the guide or retaining block 64, or its equivalent, were not provided.

One of the greatest difficulties in machine gun practice is the tendency of the cartridges to jam, and the difficulty of removing the jammed cartridge. No matter how well the gun is made, there is likelihood of jamming, because very often it is attempted to use cartridges which do not fit properly. By providing the window or opening in the location specified, a great deal of this difficulty is overcome, because the machine gun operator is enabled to get at the jammed cartridge quickly and easily to remove it from the gun through the window. The value of the window as a means for inspecting the operation of the mechanism is also very important, as will be understood. Facilities for inspection of the breech mechanism, and for removal of jammed cartridges, have heretofore been very inadequate in the type of gun to which my invention especially relates, for it has evidently been thought hitherto that the provision of a large opening in one of the side plates for inspection and repair would render the gun inoperative, owing to the loss of certain guiding and housing surfaces.

The piston or plunger 28 is mounted to slide forwardly and rearwardly beneath the barrel in the cylinder bore 52, the front end of the piston being provided with suitable packing, and the piston is tubular in form so as to contain the main action spring 66. The action rod 29 comprises a tubular part which is preferably formed as an integral extension on the piston, and which likewise fits over the coiled action spring 66, and said action rod further comprises a forked rear portion 67 mounted to reciprocate forwardly and rearwardly in the receiver, and adapted to actuate the breech bolt 34. The forked rear portion 67 of the action rod is preferably formed as a separate piece, having a threaded socket 68 in the intermediate portion 67ᵃ of the fork into which is screwed a threaded shank 69 at the rear end of the forward section of the rod 29. The spring 66 is a long coiled spring supported at its rear end on a forwardly projecting supporting pin 70 mounted on a bracket 71 which lies flatwise under the rear portion of the barrel and is secured rigidly in place by a lug 72 thereon fitting in a portion of the threaded barrel socket 46ᵃ in the forward end of the receiver, as shown more particularly in Fig. 8. Thus the bracket 71 is positively and firmly locked in position by placing the lug 72 in the socket 46ᵃ preliminary to inserting the barrel, and then screwing in the barrel to clamp the bracket tightly in place. The pin 70 is carried by an angular depending portion 73 at the forward end of the bracket, and extends forwardly in the bore of the action rod, so as to support the action spring effectively and guide the action rod to a certain extent, it being understood that the spring fits the bore of the action rod and piston rather snugly so as to have only the necessary amount of play therein. The forward end of the spring contacts with the front wall of the piston as shown more particularly in Fig. 7. When the piston is forced back by the explosive gases from the position shown in Fig. 7 to that shown in Fig. 5 the spring 66 will be compressed against the bracket 71 in an obvious manner, and as the gas pressure spends itself the spring expands and thereby restores the action rod to its initial position.

The forked rear portion 67 of the action rod is partially shown in detail in Figs. 16 and 17. Its side portions or branches are guided for reciprocation in suitable guide grooves 74 in the receiver, and disposed in the rear extremities of these guide grooves are buffer springs 75 located in sockets 76 in the rear wall member of the receiver, and adapted to engage at their forward ends with the respective rear extremities of the fork when the latter is forced back by the gases generated by the explosion. In this way the rearward movement of the action rod is effectively cushioned so that there is a minimum amount of shock. The action rod controls the breech bolt 34 in a well known manner through a cross pin 78 connecting two legs of the fork near the rear extremities thereof, and engaging an angular slot 79 in a fin or shank 80 extending down from the rear part of the breech bolt. Supposing the parts to be in the position shown in Fig. 8, with the pin 78 in the upper end of slot 79, the rearward thrust of the action rod causes the pin to travel to the rear end of the slot, thereby elevating the rear end of the breech bolt, releasing it from the shoulders 81 (Fig. 15) in front of which it is locked, and moving it rearwardly in its guide-way as shown in Fig. 6. On the forward movement of the action rod the pin 78 on said rod moves forward in the angular slot after the rear end of the breech bolt has passed in front of the shoulders 81, and thereby moves the bolt downward by virtue of the inclination of the slot, so that it engages in front of the shoulders 81 and is thereby locked in the firing position shown in Fig. 8.

The breech bolt is furnished with the usual firing pin and extractor and the side of the receiver is furnished with the usual ejector. These parts being well known, I have not considered it necessary to illustrate them in detail.

In advance of the pin 78 the action rod is provided with the depending extractor 41 previously mentioned, which moves the cartridge rearwardly from the feed belt onto the carrier 42. This extractor 41 is independently movable and spring pressed, it being provided at its upper rear portion with a perforated ear 82 by means of which it is pivoted by a pin 83 between the legs or branches of the forked action rod. A small coiled spring 84 acting on the rear part of the extractor back of the pivot 83 tends to press the forward end of the extractor in an upward direction, and this forward end is provided with a hook 85, to engage the under part of the rim of the cartridge for the purpose of pulling the cartridge out of the belt. The hook 85 engages the under portion of the cartridge on the feed belt, and a resilient extractor 86 is also carried by the under part of the action rod to engage the rim of the cartridge at one side of the latter. The spring 84, associated with the extractor 41, enables the latter to yield somewhat in withdrawing the cartridge from the belt, which is a feature of advantage in preventing the jamming of the cartridge. The hooked end of the extractor 41 cooperates with a small pivoted spring pressed abutment 87 located beneath the same, which abutment is so mounted and arranged that as the extractor moves rearwardly the abutment supports it from beneath rigidly, if the extractor tends to give way too much, while on the other hand, the abutment will yield freely if the hook 85 strikes it during the forward movement of the action rod, so that the extractor will always be brought to its proper extracting position relatively to the feed wheel for the cartridge belt.

The feed wheel 39 is intermittently rotated in the usual manner to feed the cartridges by any preferred mechanism, but preferably the actuating mechanism for the feed wheel will comprise a ratchet lever 88 pivoted at 89, and actuated by a lever 90 pivoted at 91, and having a pin 92 working in a slot 93 of lever 88. The lever 90 engages in a cut-away portion 94 in one leg of the forked portion of the action rod, as shown in Fig. 14. As the action rod is thrust forwardly by its spring a shoulder at the rear end of the cut-away portion 94 engages the lever 90 to swing lever 88 downward and thereby rotate the feed wheel to bring a new cartridge into position, whereas when the action rod is moved rearwardly, as shown in Fig. 14, a shoulder at the forward end of the cut-away portion 94 engages lever 90 to raise or withdraw the ratchet 88 prior to another feeding movement.

The carrier 42 is bifurcated as shown, for example, in Fig. 6^A, and the extractor 41 may work freely between the side walls of the carrier. At the rear under portion of the action rod the legs of the fork are cut away at 95 to form cam notches, which cooperate with a cam 96 pivoted on the rear end of the carrier at 97 and normally pressed counter clock-wise, (Fig. 18) by a spring pressed plunger 98 mounted in a suitable socket in the carrier. This movable cam 96, adapted to engage the cam surface of the action rod, prevents the action rod and carrier from sticking or jamming. The counter clock-wise rotation of cam 96 on its pivot (Fig. 18) is limited by a stop surface 99 on the carrier which forms a rigid abutment for the cam. When the action rod moves rearwardly its rear end portion strikes the cam 96 which is thereby freely depressed and moves out of the way of the action rod, owing to the provision of the spring 98$^a$ acting on the plunger. In this manner the carrier is permitted to retain its normal substantially horizontal position, so that the cartridge will be properly carried back onto the same. As the action rod moves forward, however, the curved surfaces of the cam notches 95 therein take up against the periphery of cam 96, which is then unable to yield, owing to the provision of the shoulder 99, and consequently the cam 96 acts as a rigid part of the carrier, and the cam surfaces 95 co-acting therewith cause the rear end of the carrier to be thrust down as the action rod moves forward, thereby thrusting upward the forward end of the carrier, flipping the cartridge thereon upward into line with the advancing breech bolt, which then chambers the same.

The starting handle 44 previously mentioned is preferably located alongside the right hand side plate and guided thereon and may conveniently comprise a flat metal bar having a loop shaped grip 100 at the rear end thereof extending into proximity to the handle 32 of the gun, the forward end of the bar being arranged to pull the action rod rearwardly. For this purpose, the forward end is connected by means of a screw 101 with a retracting block 102 guided longitudinally in the side plate by engaging a longitudinal slot 103 therein, as shown in Figs. 13^A and 13^B. The block 102 lies in front of a portion of the intermediate part or yoke 67$^a$ of the action rod fork. It will therefore be understood that if the handle be pulled from the position shown in Fig. 3, in which the retracting block 102 is at the forward end of its guide slot, to the position shown in Figs. 4 and 13^A, in which the block is at the rear end of its slot, the action rod will be pulled back to open the barrel chamber and pull a cartridge out of the belt onto the carrier. When the handle is released by the operator, the action spring 66 will carry the action rod and handle back to their initial positions, the forward movement of the breech bolt operating the carrier to throw the cartridge into the chamber, as previously described, and the breech bolt being locked by the action rod. In this manner, the gun may be very readily charged by hand in starting, and it may then be set in operation by pulling the trigger 35. The general operation of the gun subsequently to the pulling of the trigger is familiar to those versed in the art, and will be obvious from the foregoing description. When it is desired to hold the chamber open while the parts of the mechanism are examined or cleaned, this may be done by locking the handle in its rearmost position. To this end, the handle bar is provided with a locking shoulder 104, to cooperate with a guide clip 105 for the handle near the rear end of the slide plate 31. In order to lock the handle, the same is pulled rearwardly in the clip 105 until the shoulder 104 is on the rear side of the clip, and it is then moved down into locking engagement therewith, as shown in Fig. 4. The handle is normally locked in the advanced position by a notch 104ª therein adapted to fit over the lower part of the clip, as shown in Fig. 3.

The trigger 35 is pivoted at 106 to the lower forward part of the handle 32, where it enters the receiver, the forward end of the trigger having a hook 107 to engage in front of a forwardly facing collar 108 on the head 109 of the hammer 33. The sear 36 previously mentioned is also mounted on the pivot 106 alongside the trigger, but instead of cooperating with the shoulder 108, as in some prior machine guns, it cooperates with an intermediate forwardly facing shoulder 110 located at the rear of the sear pivot when the parts are in the position shown in Fig. 6. The forward end of the sear is acted upon by a small spring 111 tending to press the rear end 36ª of the sear up into the path of the shoulder 110 and thereby tending to lock the hammer very securely in the retracted or inoperative position. The hammer is acted on by the usual hammer spring 112 housed in the rear part of the handle. The sear is controlled automatically from the action rod by a trip lever 113, pivoted on the pin 114 in a recess in the left hand wall of the receiver. The forward end of the trip lever is provided with a laterally projecting pin 115 cooperating with the action rod, while the rear end of the lever carries a laterally projecting pin 116 to cooperate with the sear. The pin 116 is located underneath the forward end of the sear, as shown in Figs. 6 and 8. The pin 115 is adapted to travel in a longitudinal groove 117 at the under portion of the action rod fork, as shown in Figs. 16 and 17. When the action rod is advancing and the gun is being charged with a fresh cartridge, the groove 117 provides clearance for the pin 115 on the trip lever, so that the sear under the influence of its spring 111 holds back the hammer (forced back by the rearward movement of the breech bolt), so that a premature explosion cannot take place. Just as the action rod locks the breech bolt in its advanced position so as to lock the cartridge in the chamber, the pin 115 of the trip lever engages a shoulder 118 at the rear end of groove 117, and the forward end of the trip lever is forced down, thereby raising its rear end and causing the pin 116 to engage and release the sear in an obvious manner. In this manner, the cartridge will be discharged just as, but not until, it is properly chambered, and the gun will operate automatically as long as the trigger is held in the released position.

The handle 32 is removably socketed in an opening in the rear end of the receiver, and is held therein by a special form of latch, shown in detail in Fig. 13. At opposite sides of the rear end of the receiver, the same is provided with slots or kerfs in which are located locking plates 119, 120 respectively, adapted when in the position shown in Fig. 13 to engage vertical grooves 121 in the respective sides of the tubular part of the handle. The plates 119, 120 are pivoted to the receiver at 119ª, 120ª respectively so that they can swing inward and outward in the slots. The grooves 121 come opposite the kerfs and the plates 119, 120 when the handle is in the proper position relatively to its socket, and in order to lock the handle effectively in place, the plates 119, 120 are swung inward and interconnected by a locking plate 122, pivoted to the plate 120 at 123, and having a notch 124 in which the outer end of plate 119 is received. To remove the handle, the connecting plate 112 is grasped and pulled upward, and the plates are swung into the releasing positions shown by dotted lines in Fig. 13, whereupon the handle may be freely pulled out of the rear end of the receiver.

The side plates 30, 31 are held in assembled position relatively to the rear end of the receiver by a bolt 125, which passes through openings in the depending cheek portions of the receiver, as shown in Fig. 13, and also through the rear wall 126 of the receiver which is formed in part by an upwardly directed wall at the rear of the bottom plate 40. The end of the bolt 125 has threaded engagement with a socket in the plate 31, and the bolt is provided with a head 127 for engagement by a wrench. This bolt locks together the two sides plates, the receiver and the bottom plate, and it will be apparent that by removing the two bolts 49, 125, which can be readily done, the main parts of the gun can be very readily taken down for inspection, cleaning or repairs.

The gun may be locked to the tripod by a pin passing through an opening 128 formed partly in the side plates and partly in the bottom plate. This, however, is a well-known feature.

The improved gun is of very simple, compact construction involving a minimum number of parts, when the functions required are considered, and the ease and rapidity with which the structure can be assembled and taken down is a very important factor. The accessibility of the cartridge by way of the window 61 while on the carrier, and at various stages of its passage to the firing chamber, is another very valuable feature, for the reasons previously explained.

Various changes may be made in the details of the construction, without departing from the scope of the invention as defined in the claims.

What I claim is:—

1. In an automatic firearm, a receiver, a breech mechanism movable therein, including a breech bolt, a barrel extending forwardly from the receiver, a cylinder arranged under the barrel and in communication with a gas port in the barrel, a piston operating in said cylinder and operatively connected with said breech mechanism, and quick-acting means including a cam member for detachably clamping said cylinder to the barrel.

2. In an automatic firearm, a receiver, breech mechanism movable therein, a barrel extending forwardly from the receiver, and having a downwardly leading gas port therein, a cylinder member arranged under the barrel and having a bore in communication with said gas port, a piston in said bore operatively connected with said breech mechanism, and quick-acting means including a cam member for detachably clamping said cylinder member on said barrel with the required tightness of fit between the parts around said gas port.

3. In an automatic firearm, a receiver, breech mechanism movable therein, a barrel extending forwardly from the receiver, side plates extending forwardly from the receiver alongside the barrel, a gas cylinder beneath the barrel and parallel therewith and located between said side plates, said barrel having a gas port and said cylinder being in communication therewith, quick-acting means including a cam member for detachably clamping said cylinder in place, and a piston in said cylinder operatively connected with said breech mechanism.

4. In an automatic firearm, a receiver, a breech mechanism movable therein, a barrel extending forwardly from the receiver, side plates extending forwardly from the receiver alongside said barrel, said barrel having a gas port, a cylinder parallel to the barrel beneath the same and in communication with said gas port, a piston in said cylinder operatively connected with said breech mechanism, and quick-acting means including a cam member for detachably clamping said cylinder to said barrel, and supporting the ends of said plates.

5. In a machine gun, the combination of a receiver, breech mechanism therein, a barrel extending forwardly from the receiver and having a gas port in the under part thereof, side plates extending forwardly from the receiver alongside the barrel, a gas cylinder arranged under the barrel parallel thereto and between said side plates and in communication with said gas port, a piston in said cylinder operatively connected with said breech mechanism, and means for detachably securing said cylinder to said side plates.

6. In a machine gun, a receiver, breech mechanism therein, a barrel extending forwardly from the receiver and having a gas port therein, a collar member around the barrel adjacent said gas port, a cylinder member generally parallel to the barrel and in communication with said gas port, detachable means for securing said cylinder member to said collar and the collar to the barrel, and a piston operating in said cylinder member and connected with said breech mechanism to actuate the same.

7. In a machine gun, a receiver, breech mechanism therein, a barrel extending forwardly from the receiver, side plates extending forwardly from the receiver alongside the barrel, said barrel provided with a gas port, a cylinder member arranged beneath the barrel between said side plates and in communication with said gas port, a common means for securing the side plates and the cylinder member detachably to the barrel, and a piston operating in said cylinder member and connected with the breech mechanism to actuate the same.

8. In an automatic firearm, a receiver, breech mechanism therein, a barrel secured to the receiver, side plates on opposite sides of the receiver extending forwardly alongside the barrel, a collar on the barrel, said barrel provided with a gas port, a cylinder member arranged under the barrel in communication with said gas port, and located adjacent said collar between said side plates, detachable means for securing the side plates, cylinder and collar in position relatively to the barrel, and a piston operating in the cylinder and connected with said breech mechanism.

9. In an automatic firearm, the combination of a barrel having a gas port in the end portion thereof, a cylinder forging arranged generally parallel to the barrel beneath the same and in communication with said gas port, a collar embracing the barrel and having depending cheeks on opposite sides of the cylinder forging, and fastening means extending through said cheeks and the cylinder forging.

10. In an automatic firearm, a barrel having a gas port near the forward end thereof and at the under side of the same, a cylinder forging located beneath the barrel and having a bore therein and an upwardly extending duct leading to said gas port, a collar on the barrel, and quick-acting means carried by said collar for detachably clamping said cylinder forging to said barrel.

11. In an automatic firearm, a barrel having a gas port in the under portion thereof, a cylinder member substantially parallel to the barrel beneath the same and having a longitudinal bore and a duct leading from said bore, said duct and gas port being adapted to register, and the cylinder member and barrel having contacting bearing surfaces around said gas port at the forward end of the said member, the latter having an additional bearing on the barrel adjacent the rear end of the said member, and a collar located intermediate the ends of the cylinder member for securing it on the barrel.

12. In an automatic firearm, a barrel having a gas port, a cylinder having a gas duct to register with said port, and quick acting regulable means including a bolt having a cam portion to engage the cylinder to clamp it to the barrel, and means for locking said regulable means.

13. In an automatic firearm, a barrel having a gas port, a member having a duct to register with said port, and means including a bolt having a cam portion to engage said member to clamp it to the barrel with the required amount of tightness.

14. In an automatic firearm, a barrel, a cylinder, a collar embracing the barrel, and a detachable bolt having a cam portion to engage said cylinder to clamp it against the barrel.

15. In an automatic firearm, a barrel, a cylinder beneath the same, a collar embracing the barrel and having depending cheeks straddling the cylinder, and a detachable bolt passing through the cheeks and cylinder, said bolt having a cam portion to force the cylinder against the barrel as the bolt is turned, and means to lock said bolt.

16. In an automatic firearm, a receiver, a breech mechanism movable therein, a barrel extending forwardly from the receiver, side plates extending forwardly from the receiver alongside said barrel, said barrel having a gas port, a cylinder parallel to the barrel beneath the same and in communication with the gas port, a piston in said cylinder operatively connected with said breech mechanism, a yoke surrounding the barrel, a cam member carried by said yoke for detachably clamping the cylinder to the barrel and supporting the ends of the side plates.

17. In an automatic firearm, a barrel, a cylinder beneath the same, a collar embracing the barrel and having depending cheeks straddling the cylinder, and a detachable bolt passing through the cheeks and cylinder, said bolt having a cam portion to force the cylinder against the barrel as the bolt is turned.

18. In a firearm, a barrel, a cylinder beneath the same, a collar embracing the barrel, and straddling the cylinder, side plates outside of the collar and cylinder, and a detachable member for securing together said elements.

19. In a firearm, a barrel, a cylinder beneath the same, a collar embracing the barrel and having cheeks passing down on opposite sides of the cylinder, side plates outside of said cheeks, and a detachable fastening member passing through the side plates and cylinder.

20. In a firearm, a barrel, a cylinder beneath the same, a collar embracing the barrel and having cheeks passing down on opposite sides of the cylinder, side plates outside of said cheeks, and a detachable fastening member passing through the side plates and cylinder, said fastening member having a cam portion to force the cylinder into tight contact with the barrel.

21. In a firearm, a barrel, a cylinder forging, and securing means for the cylinder forging, including a cam bolt for forcing said forging tightly against the barrel.

22. In a firearm, a barrel, a separate member beneath the same, and means including a bolt having a cam portion to engage said member to hold said parts together.

23. In a firearm, a barrel, cheeks depending therefrom, a member guided vertically between said cheeks, and means including a cam member for securing said member in position.

24. In a firearm, a barrel, cheeks depending therefrom at opposite sides, said barrel having a gas port, a cylinder member communicating with said gas port, said cylinder member having grooved engagement with said cheeks whereby it is guided vertically between said cheeks, and means for securing said cylinder member in position.

25. In a firearm, a barrel, cheeks depending therefrom at opposite sides, said barrel having a gas port in the under part thereof, a cylinder mounted between said cheeks for vertical movement, said cheeks being separated from each other at their lower ends to permit removal of the cylinder, and a member connecting the cheeks for securing the cylinder in position.

26. In a firearm, a barrel, cheeks depending therefrom at opposite sides, said barrel having a gas port in the under part thereof, a cylinder having a duct, means for guiding said duct into register with said gas port, and a cylinder between said cheeks for vertical movement, and a bolt passing transversely through the cheeks and cylinder for securing the latter in position.

27. In a machine gun, a barrel, a receiver, side plates extending alongside the barrel, breech mechanism in the receiver, said barrel being provided with a downwardly leading gas port, a collar embracing the barrel adjacent the gas port and having depending cheeks, a cylinder insertable between said cheeks from beneath and having a duct adapted to register with said gas port, a fastening bolt for the cylinder passing through the side plates and cheeks, and a piston operating in said cylinder and connected with said breech mechanism.

28. In a machine gun, a receiver, breech mechanism therein, a barrel, a gas cylinder and piston operatively associated with the barrel and connected with said breech mechanism, a feed wheel for a cartridge belt located beneath the receiver, a carrier detachable side plates applied to opposite sides of the receiver and having entrance and exit openings respectively for the feed belt, said receiver having an ejection opening, and one of said side plates having a window affording access to the cartridge intermediate the feed wheel and barrel.

29. An automatic firearm having a receiver, a barrel, a breech bolt, a feed device, a carrier, and a side plate on the receiver having a window affording access to the cartridge intermediate the feed device and barrel, a closure therefor and cartridge-supporting means carried by said closure.

30. An automatic firearm, having a receiver, a barrel, a breech bolt, a cartridge feed device, a carrier, a side plate on the receiver having an opening, a closure for said opening, and cartridge-supporting means on said closure.

31. A machine gun having a receiver, a barrel, a breech bolt, a cartridge feed wheel, a carrier in the lower part of the receiver rearwardly of said feed wheel, an extractor for carrying the cartridge from the belt on the feed wheel onto the carrier, and means for operating said parts automatically, said receiver having a window at one side of greater length than the cartridge exposing a considerable part of the carrier and affording access to the cartridge in the event of jamming, said window having a closure member, and said closure member having a cartridge-supporting part located in position adjacent the carrier when said closure is in the closed position.

32. In a machine gun, a receiver, a barrel, breech mechanism in the receiver, side plates extending alongside the receiver and barrel adjacent the lower parts thereof, the barrel having a gas port at its under side, a cylinder arranged parallel to the barrel beneath the same and in communication with said gas port and located in the space between said side plates, means connecting said barrel, cylinder and plates, and an action rod having a piston at its forward end working in said cylinder and operatively connected at its rear end to said breech mechanism.

33. In an automatic firearm, a receiver, a barrel carried thereby, side plates embracing said receiver and extending along said barrel, longitudinal grooves in said plates, a bottom plate having its side edges fitting in said grooves, a bolt passing through the rear end of said receiver side plates and bottom plate, and a bolt supported by the barrel passing through the forward end of said plates.

34. In an automatic firearm, a receiver, a barrel carried thereby, side plates embracing said receiver and extending along said barrel, longitudinal grooves in said plates, a bottom plate having its side edges fitting in said grooves, a bolt passing through the rear end of said receiver, side plates and bottom plate, and a bolt supported by the barrel passing through the forward end of said plates, one of said side plates having a slot therethrough whereby access may be had to the interior of the firearm.

35. A machine gun having a receiver, a barrel, breech mechanism in the receiver, a gas cylinder in communication with the barrel located beneath the barrel and in general parallelism therewith, an action rod having a piston working in the cylinder and operatively connected with the breech mechanism, side plates extending alongside the receiver and barrel, one of said plates having a slot, a block guided in said slot in operative relation to the action rod and adapted to retract the same, a starting handle slidably mounted on the outside of said side plate and connected with said retracting block, a handle at the rear end of the receiver having a trigger associated therewith, and a grip portion on the rear end of said starting handle, in proximity to said trigger.

36. A machine gun having a receiver, a barrel, breech mechanism, a gas cylinder in communication with the forward part of the barrel, an action rod having a piston in said gas cylinder and connected with said breech mechanism, a side plate, a forwardly and rearwardly movable starting handle mounted on the outside of said plate, said plate having a slot therein through which the handle extends into cooperation with said action rod to retract the same, means for guiding the rear end of the handle, and means for locking the handle in any one of a number of positions.

37. In an automatic firearm, a receiver having a threaded barrel socket, a barrel having a threaded portion screwed into said socket and having a gas port, breech mechanism in the receiver, a gas cylinder in communication with said gas port, a piston operating in said cylinder, said piston being of tubular form, a coiled action spring in said piston, a supporting bracket for said spring, and a part on said bracket extending into said barrel socket and removably clamped to the receiver by the barrel.

38. In an automatic firearm, a receiver having horizontal longitudinal guide grooves in opposite side walls thereof, a barrel, breech mechanism, an action rod operatively connected with said breech mechanism the rear end of said action rod being forked and traveling in the guide grooves of the receiver, buffer springs at the rear ends of the respective grooves to cooperate with the respective extremities of the action rod fork, and thereby cushion the rearward movement of the action rod, and means for operating the breech mechanism by the action rod.

39. In an automatic firearm, a receiver, a barrel, an action rod, a breech bolt operatively connected with the action rod, a cartridge carrier, a cartridge feed device, a spring pressed extractor pivotally mounted on the action rod to move from the feed device over the carrier, and a pivoted abutment member cooperating with said extractor to limit movement of the latter while extracting a cartridge.

40. In an automatic firearm, a receiver, a barrel, an action rod, a breech bolt operatively connected with the action rod, a cartridge carrier, a cartridge feed device, a spring pressed extractor pivotally mounted on the action rod to move from the feed device over the carrier, and a pivoted yielding spring pressed abutment member cooperating with said extractor to limit movement of the latter while extracting a cartridge.

41. In a firearm, a barrel, cheeks depending therefrom at opposite sides, said barrel having a gas port in the under part thereof, a cylinder, means for guiding said cylinder between said cheeks for vertical movement, said cheeks being separated from each other at their lower ends to permit removal of the cylinder, and a bolt passing transversely through the cheeks and cylinder for securing the latter in position.

42. In a firearm, a barrel, cheeks depending therefrom at opposite sides, said barrel having a gas port in the under part thereof, a cylinder forging, means for guiding said cylinder forging between said cheeks for vertical movement, said cheeks being separated from each other at their lower ends to permit removal of the cylinder forging, and a bolt passing transversely through the cheeks and forging for securing the latter in position, said bolt having a cam portion to force the cylinder forging against the barrel.

43. In a machine gun, a barrel, a receiver, side plates extending forwardly from the receiver alongside the barrel, breech mechanism in the receiver, the forward end portion of the barrel being provided with a downwardly leading gas port, a collar embracing the barrel adjacent the gas port and having depending cheeks, a hollow gas-receiving member held against turning movement between said cheeks and having a duct adapted to register with said gas port, the forward ends of the side plates having a dovetail connection with the respective cheeks, a fastening bolt passing through the side plates and cheeks and the hollow member, and a piston operating in said hollow member and connected with said breech mechanism.

In witness whereof, I have hereunto set my hand on the 14th day of April, 1917.

CARL GUSTAF SWEBILIUS.